(12) United States Patent
Saito

(10) Patent No.: US 7,132,186 B2
(45) Date of Patent: Nov. 7, 2006

(54) FUEL CELL WITH SOLID POLYMER MEMBRANE TO BE MOISTURIZED, FUEL CELL SYSTEM, AND MOISTURIZING METHOD FOR FUEL CELL

(75) Inventor: Kazuo Saito, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 457 days.

(21) Appl. No.: 10/148,832

(22) PCT Filed: Sep. 12, 2001

(86) PCT No.: PCT/JP01/07912

§ 371 (c)(1),
(2), (4) Date: Jun. 5, 2002

(87) PCT Pub. No.: WO02/23660

PCT Pub. Date: Mar. 21, 2002

(65) Prior Publication Data

US 2002/0182474 A1    Dec. 5, 2002

(30) Foreign Application Priority Data

Sep. 12, 2000    (JP) .............................. 2000-277138

(51) Int. Cl.
*H01M 8/04* (2006.01)

(52) U.S. Cl. .............................. 429/26; 429/24; 429/30; 429/34

(58) Field of Classification Search .................. 429/30, 429/34, 35, 38, 39, 37, 26, 24, 20, 32
See application file for complete search history.

(56) References Cited

U.S. PATENT DOCUMENTS

| | | | |
|---|---|---|---|
| 4,539,942 A | * | 9/1985 | Kobayashi et al. ........ 123/41.1 |
| 5,284,718 A | | 2/1994 | Chow et al. |
| 5,456,129 A | * | 10/1995 | Tane et al. ...................... 74/467 |
| 6,451,470 B1 | * | 9/2002 | Koschany et al. ............ 429/40 |
| 2002/0086195 A1 | * | 7/2002 | Gorman et al. ............... 429/26 |

FOREIGN PATENT DOCUMENTS

| | | |
|---|---|---|
| EP | 0 831 543 A1 | 3/1998 |
| EP | 0 980 107 A1 | 2/2000 |
| EP | 1 020 942 A1 | 7/2000 |
| JP | 3-182052 A | 8/1991 |
| JP | 05-36428 * | 2/1993 |

(Continued)

*Primary Examiner*—Raymond Alejandro
(74) *Attorney, Agent, or Firm*—Foley & Lardner LLP

(57) ABSTRACT

A fuel cell has an anode (3) and a cathode (5) on either side of an electrolytic membrane (1) made of a solid polymer. A fuel supply plate (7) and an air supply plate (9) are provided at either side of the electrolytic membrane (1), so as to form a fuel cell with a solid polymer membrane. A fuel supply path (11) is provided on the anode (3) side of the fuel supply plate (7), and an air supply path (13) is provided on the cathode (5) side of the air supply plate (9). Moisture supply paths (21) are provided between fuel supply paths (11) of the fuel supply plate (7), these moisture supply paths supplying moisture directly to the electrolytic membrane (1) via the anode (3). A moisture pressure-adjusting valve, which adjusts the amount of supply of moisture by opening and closing in response to the temperature of coolant effluent from the fuel cell, is provided at a moisture introduction part which introduces moisture to the moisture supply paths (21).

13 Claims, 9 Drawing Sheets

FOREIGN PATENT DOCUMENTS

| | | | |
|---|---|---|---|
| JP | 8-287934 A | | 11/1996 |
| JP | 09-242593 | * | 9/1997 |
| JP | 11-162490 | | 6/1999 |
| JP | 11-233126 A | | 8/1999 |
| JP | 2000-164229 | | 6/2000 |

* cited by examiner

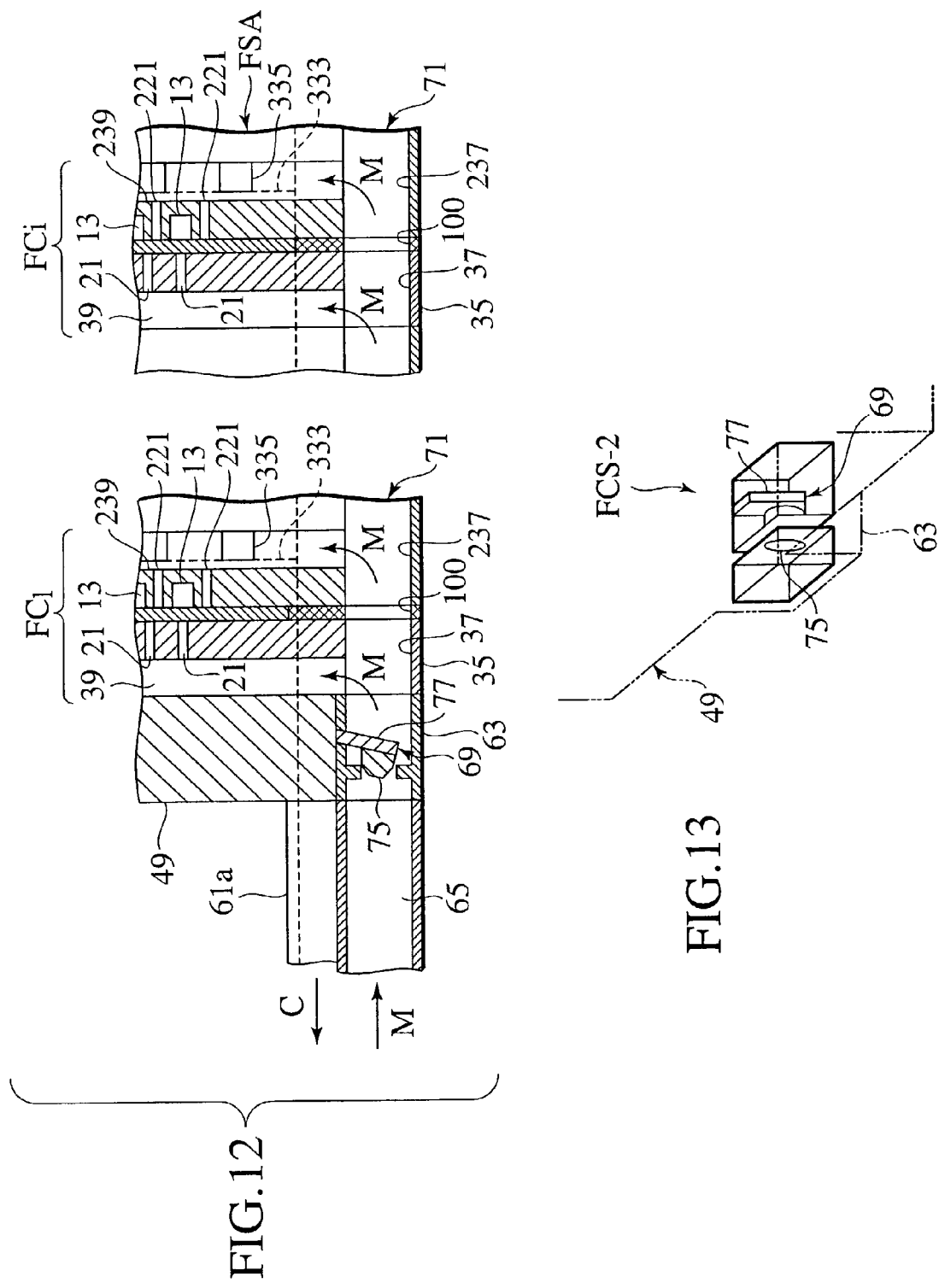

FUEL CELL WITH SOLID POLYMER MEMBRANE TO BE MOISTURIZED, FUEL CELL SYSTEM, AND MOISTURIZING METHOD FOR FUEL CELL

TECHNICAL FIELD

The present invention relates to a fuel cell with a solid polymer membrane to be moisturized, a fuel cell system including a stack of fuel cells, and a moisturizing method for a fuel cell. More specifically, the invention relates to a fuel cell having a solid polymer membrane as an electrolytic membrane disposed between an anode and a cathode and needing to be moisturized, a fuel cell system including a stack of fuel cells each respectively having a solid polymer membrane as an electrolytic membrane to be moisturized, and a moisturizing method for a fuel cell having a solid polymer membrane as an electrolytic membrane to be moisturized.

BACKGROUND ART

In a fuel cell having a solid polymer membrane as a PEM (proton exchange membrane) made of an electrolytic substance, this electrolytic membrane is disposed between a "region supplied with a fuel to be dissociated to promote an anodic action" (herein called "anode") and a "region supplied with air as an oxydant for promoting a cathodic reaction" (herein called "cathode"). At the anode, where hydrogen is supplied as the fuel, this hydrogen ($H_2$) is dissociated into hydrogen ions ($H^+$) and electrons ($e^-$), such that $H_2 \rightarrow 2H^+ + 2e^-$. The hydrogen ions are transported through the electrolytic membrane, from the anodic side to the cathodic side. The electrons are conducted from the anode to the cathode through external circuitry connected therebetween, thereby supplying electric power to a load in the circuitry.

At the cathode, oxygen ($O_2$) in the air supplied thereto reacts on hydrogen ions ($H^+$) transported thereto and electrons ($e^-$) conducted thereto, producing water ($H_2O$) to be ejected outside the fuel cell, such that $\frac{1}{2}O_2 + 2H^+ + 2e^- \rightarrow H_2O$. Therefore, in the fuel cell, as a whole, water ($H_2O$) is produced from hydrogen ($H_2$) supplied as a fuel to the anode and oxygen ($O_2$) in the air supplied to the cathode, such that $H_2 + \frac{1}{2}O_2 \rightarrow H_2O$. The hydrogen and air are sometimes each respectively called "reaction gas".

The electrolytic membrane needs to be saturated with water contained therein to serve as an ion-transportable electrolyte, and to function for isolation between hydrogen as a reaction gas at the anode and oxygen as a reaction gas at the cathode. If the water content is insufficient, the electrolytic membrane has a decreased ion mobility and/or causes an unfavorable mixing between reaction gases, resulting in a failure for the fuel cell to generate sufficient electric power.

When dissociated hydrogen ions are transported through the electrolytic membrane from the anodic side to the cathodic side, water is moved together, so that the electrolytic membrane inherently has a drying tendency at the anodic side. The water content of the electrolytic membrane is supplemented by moisture contained in reaction gas, which is supplied through gas inlet ports near the electrolytic membrane. If the moisture content of reaction gas is insufficient, the electrolytic membrane tends to be dried in regions vicinal to the gas inlet ports.

It therefore is necessary for a solid polymer membrane, as an electrolytic membrane in a fuel cell, to be moisturized by an externally supplied "moisture or hydration water" (herein collectively called "moisture"). Techniques for such "moisturization or hydration" (herein collectively called "moisturization") are disclosed in U.S. Pat. No. 5,284,718 in which fuel and air are let through semi-permeable layers in a humidification section of a fuel cell, where they are humidified, before entering an active section for their reaction, and in Japanese Patent Application Laid-Open Publication No. 11-162490 in which fuel and air are let through supply pipes, where they are humidified by externally supplied water vapor.

DISCLOSURE OF INVENTION

In the U.S. Pat. No. 5,284,718, the humidification section is built in a body of the fuel cell, needing an increased body size, with an increased weight, constituting a problem in application to the automotive fuel cell to be compact in size. Further, for the moisture of electrolytic membrane to be proper, the humidification section needs precise control of its temperature as well as of surface areas of the semi-permeable layers, which is impractical. A practical design for a 100% relative humidity to be constant of fuel and air may render the moisture of electrolytic membrane excessive under some operating condition, resulting in a clogging by water in fuel path and/or air path, with a lowered fuel cell performance.

In the Japanese Patent Application Laid-Open Publication No. 11-162490, the humidification by water vapor supplied to the fuel and air supply pipes involves a delay in moisture control of electrolytic membrane to be commensurate with piping lengths between sections for the supply of water vapor and a section for reaction of fuel and air. Further, at the startup, as the fuel cell body temperature is low, moisture in humidified fuel and air tends to condense in their supply pipes or on their way to an intra-cell reaction region, resulting in a clogging by water in such paths, with a lowered fuel cell performance.

Accordingly, it is an object of the present invention to provide a fuel cell having a solid polymer membrane as an electrolytic membrane to be moisturized, a fuel cell system including a stack of fuel cells each respectively having a solid polymer membrane as an electrolytic membrane to be moisturized, and a moisturizing method for a fuel cell having a solid polymer membrane as an electrolytic membrane to be moisturized, where moisturization can be effected on an electrolytic membrane or a set of electrolytic membranes, without making the fuel cell or the stack of fuel cells large or lowering performance thereof.

To achieve the object, according to an aspect of the present invention, there is provided a fuel cell having a solid polymer membrane as an electrolytic membrane to be moisturized, comprising a cell frame, a combination of an anode and a cathode provided in the cell frame, an electrolytic membrane disposed between the anode and the cathode, an air supply path supplying air to the cathode, a fuel supply path supplying a fuel to the anode, the fuel supply path extending through the cell frame and having a fuel supplying opening in a first wall of the cell frame contacting the anode, and a first moisture supply path supplying a moisture movable through the anode to the electrolytic membrane, the first moisture path extending through the cell frame and having a first set of moisture supplying outlets in the first wall at different locations from the fuel supplying opening.

According to another aspect of the present invention, there is provided a fuel cell system including a stack of fuel cells each respectively having a solid polymer membrane as an electrolytic membrane to be moisturized, the fuel cell system comprising a set of laminated cell frames, a combination of a set of anodes of which a corresponding anode is provided in a respective cell frame of the set of laminated cell frames and a set of cathodes of which a corresponding cathode is provided in the respective cell frame, a set of electrolytic membranes of which a corresponding electrolytic membrane is disposed between the corresponding anode and the corresponding cathode, a network of fuel supply paths supplying a fuel to the set of anodes, the network of fuel supply paths extending through the set of laminated cell frames and having a fuel supplying opening in a first wall of the respective cell frame contacting the corresponding anode, a network of air supply paths supplying air to the set of cathodes, the network of air supply paths extending through the set of laminated cell frames and having an air supplying opening in a second wall of the respective cell frame contacting the corresponding cathode, and a network of moisture supply paths supplying a moisture movable through a respective one of the corresponding anode and the corresponding cathode to the corresponding electrolytic membrane, the network of moisture supply paths extending through the set of laminated cell frames and having a set of moisture supplying outlets provided in one of the first wall and the second wall, at different locations from one of the fuel supplying opening and the air supplying opening corresponding to the one of the first wall and the second wall.

According to another aspect of the present invention, there is provided a moisturizing method for a fuel cell having a solid polymer membrane as an electrolytic membrane to be moisturized, the moisturizing method comprising supplying a fuel through a cell frame to an anode in the cell frame, via a first location on a first wall of the cell frame contacting the anode, supplying air through the cell frame to a cathode in the cell frame, via a second location on a second wall of the cell frame contacting the cathode, and supplying a moisture movable through a respective one of the anode and the cathode to an electrolytic membrane disposed between the anode and the cathode, through the cell frame and via locations on one of the first and second walls different from one of the first and second locations corresponding to the one of the first and second walls.

BRIEF DESCRIPTION OF DRAWINGS

The above and further objects and novel features of the invention will more fully appear from the following detailed description of embodiments when the dame is read in conjunction with the accompanying drawings, in which:

FIG. 12 is a longitudinal sectional view of essential portions of a fuel cell stack assembly in a fuel cell system according to another embodiment of the present invention;

FIG. 13 is a perspective view of a moisture pressure regulating valve operable with a form memory member in the fuel cell stack assembly of FIG. 12;

FIG. 14A and FIG. 14B are sectional views of a moisture pressure regulating valve operable with a bimetal member in a fuel cell system according to another embodiment of the present invention, in which FIG. 14A illustrates a close condition of the valve, and FIG. 14B illustrates an open condition of the valve;

BEST MODE FOR CARRYING OUT THE INVENTION

Figure 1:
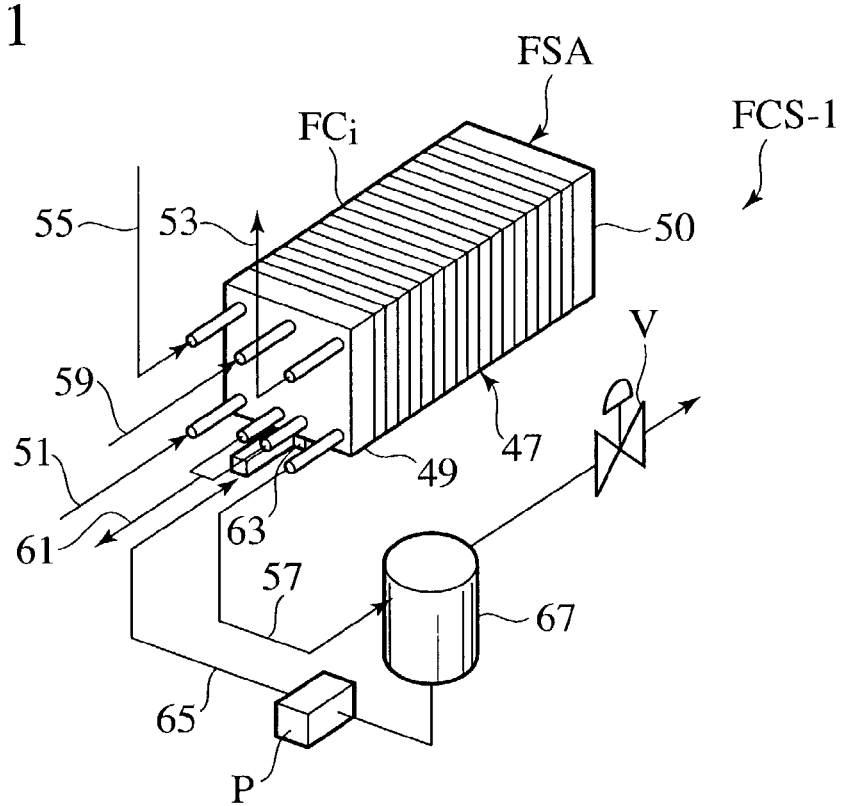
FIG. 1 is a schematic perspective view of a fuel cell system according to an embodiment of the present invention.

Preferred embodiments of the present invention are described in detail below, with references made to relevant accompanying drawings. Like members or elements are designated by like reference characters.

Figure 2:
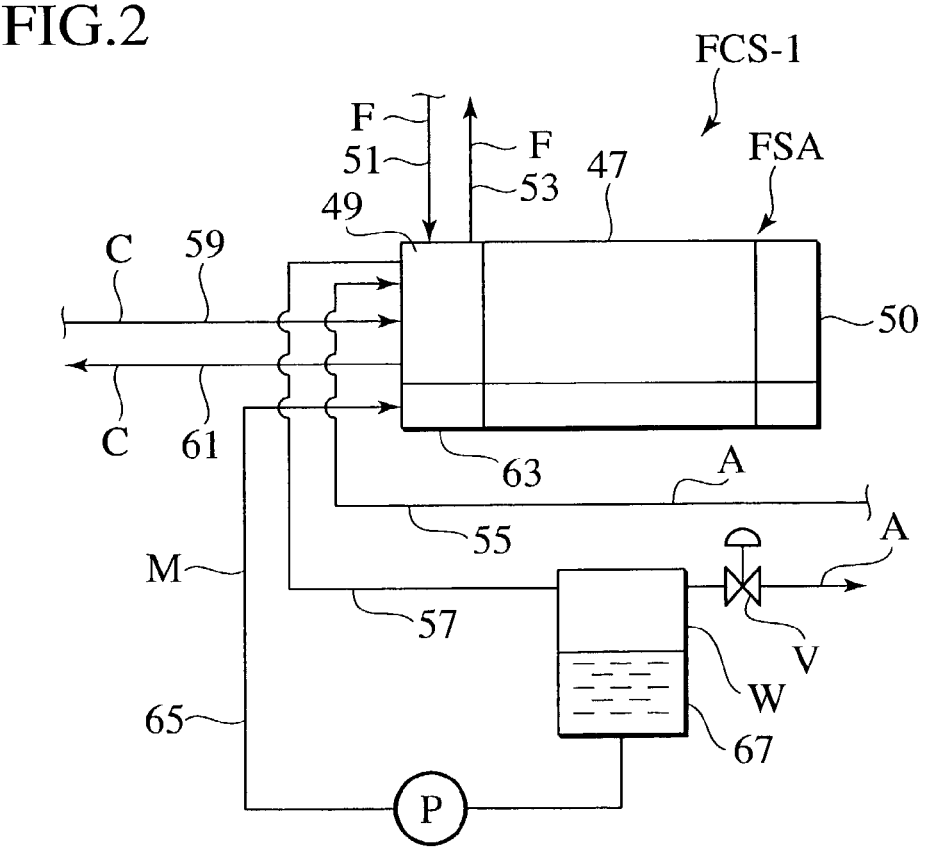
FIG. 2 is a block diagram of the fuel cell system of FIG. 1.
Figure 3:
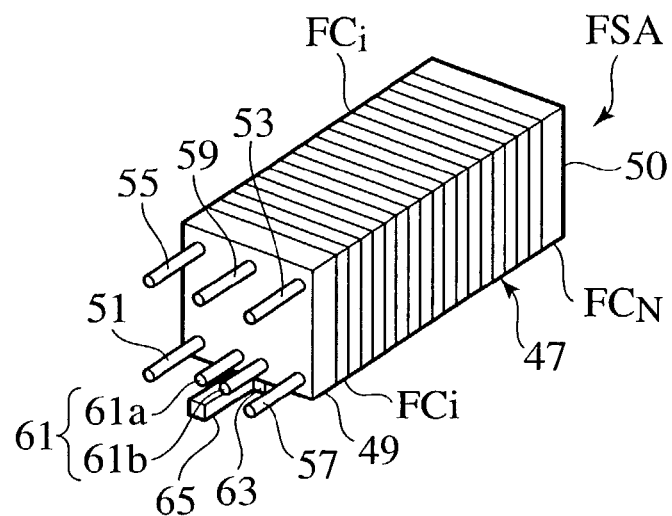
FIG. 3 is a schematic perspective view of a fuel cell stack assembly in the fuel cell system of FIG. 1.

FIG. 1 shows in a schematic form a fuel cell system FCS-1 according to a first embodiment of the present invention, FIG. 2 is a block diagram of the fuel cell system FCS-1, and FIG. 3 shows in a schematic form a fuel cell stack assembly FSA in the fuel cell system FCS-1.

The fuel cell system FCS-1 is formed by the fuel cell stack assembly FSA, and associated electrical wiring (not shown) and fluid piping for four types of fluids: an $H_2$ gas as a fuel F, air A as an oxidant, water as a moisture M, and water as a coolant C.

The fuel cell stack assembly FSA is formed as an assembly of a fuel cell stack 47 and connection pipes of the fluid piping. The fuel cell stack 47 is formed substantially in a rectangular parallelepiped configuration by a stack of a total of N ("N" is a given integer) laminated fuel cells $FC_1, \ldots,$ $FC_i$ ("i" is an arbitrary integer between 1 and N both inclusive), $\ldots, FC_N$, and a pair of front and rear end plates 49 and 50 fixed thereto. The front end plate 49 is formed as a manifold plate of the four types of fluids F, A, M, and C, and has the connection pipes fastened thereto. In the present embodiment, the fuel cell stack assembly FSA is arranged in a horizontal position, where it has a horizontal longitudinal direction and a horizontal transverse direction. The fuel cell stack 47 has a longitudinally extending moisture introducing part 63 downwardly protruding or raised at a transversely central region of the bottom thereof.

The fluid piping includes an inflow or supply line 51 of the fuel F, an outflow or effluent line 53 of the fuel F, an inflow or supply line 55 of the air A, an outflow or effluent line 57 of the air A, an inflow or supply line 59 of the coolant C, an outflow or effluent line 61 of the coolant C, and inflow or supply line 65 of the moisture M. The fuel supply line 51 is connected to a left corner in a lower part of the manifold plate as the front end plate 49, and the fuel effluent line 53 is connected to a right corner in an upper part of the manifold plate 49, so that associated connection elements in the fuel cell stack assembly FSA (for example, see ports or holes 23, 123, 223 and 25. 125, 225 in FIGS. 8–11.) are offset in a direction of a right-inclined diagonal line. The air supply line 55 is connected to a left corner in the upper part of the manifold plate 49, and the air effluent line 57 is connected to a right corner in the lower part of the manifold plate 49, so that associated connection elements in the fuel cell stack assembly FSA (for example, see ports or holes 27, 127, 227 and 29, 129, 229 in FIGS. 8–11.) are offset in a direction of a left-inclined diagonal line. The coolant supply line 59 is connected to a central region in the upper part of the manifold plate 49, while the coolant effluent line 61 is bifurcated to have a pair of left and right branches 61a and 61b connected to a central region in the lower part of the manifold plate 49, so that associated connection elements in the fuel cell stack assembly FSA (for example, see ports or holes 31, 131, 231 and 33, 133, 233, 333 in FIGS. 8–11.) are vertically offset. The moisture supply line 65 is connected to connection elements (for example, see ports or holes 37, 137, 237 in FIGS. 8–11.) in the moisture introducing part 63 of the fuel cell stack 47. It is noted that the connection elements associated with the branches 61a and 61b of the coolant effluent line 61 are configured to overlap the moisture introducing part 63 in a plan view, at a very short vertical distance from the latter 63. The air effluent line 57 has a moisture condensing separator 67 as part of a container formed with a reservoir for storing water W to be sent via a pump P to the moisture supply line 65. Past the separator 67, the air effluent line 57 extends as an air circuit installed with a back pressure regulating valve V.

Figure 4:
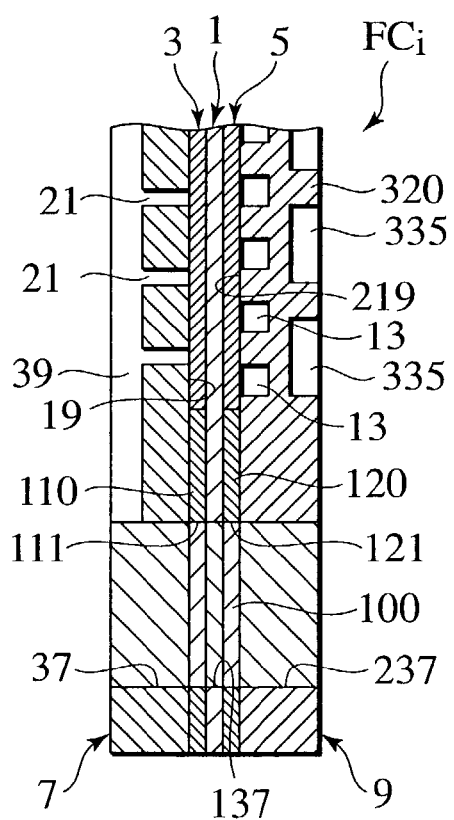
FIG. 4 is a vertical sectional view of a lower portion of a fuel cell in the fuel cell stack assembly of FIG. 3.
Figure 5:
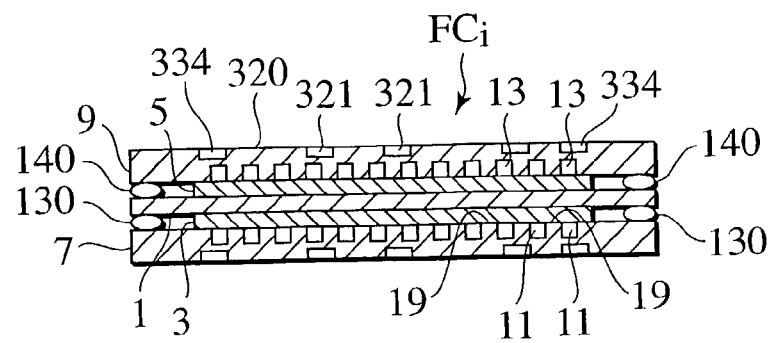
FIG. 5 is a schematic horizontal sectional view of an entirety of the fuel cell of FIG. 4.
Figure 6:
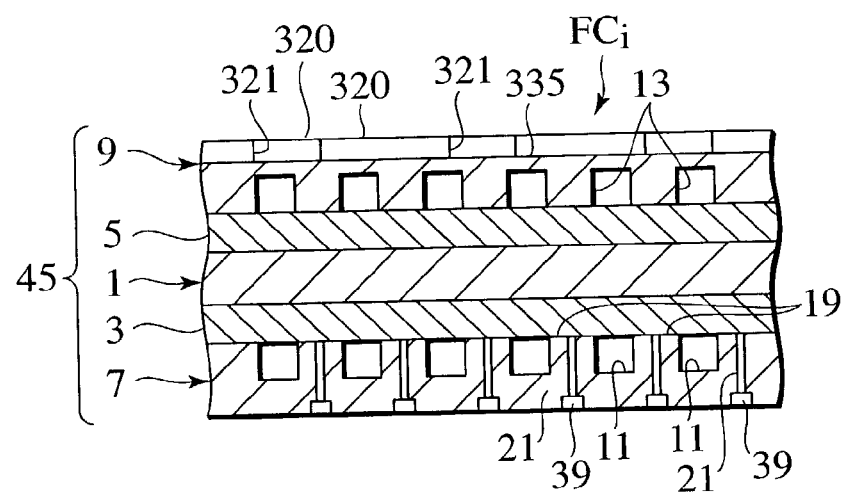
FIG. 6 is a horizontal sectional view of an essential portion of the fuel cell of FIG. 4.
Figure 7:
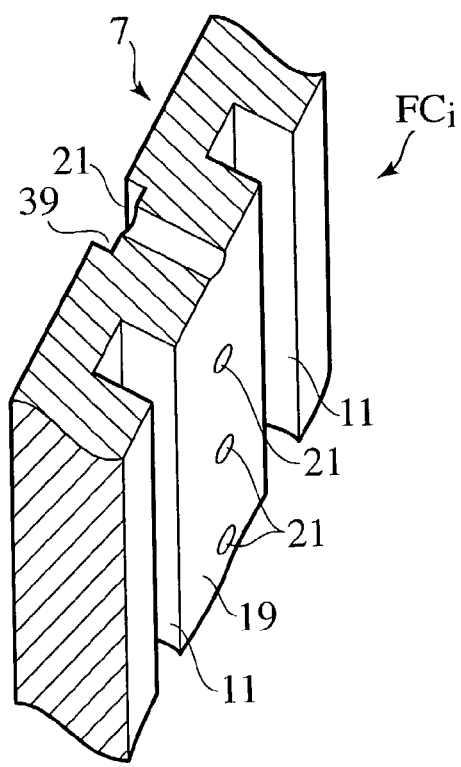
FIG. 7 is an enlarged perspective rear view, partly in section, of an essential portion of a fuel supply plate of the fuel cell of FIG. 4.
Figure 8:
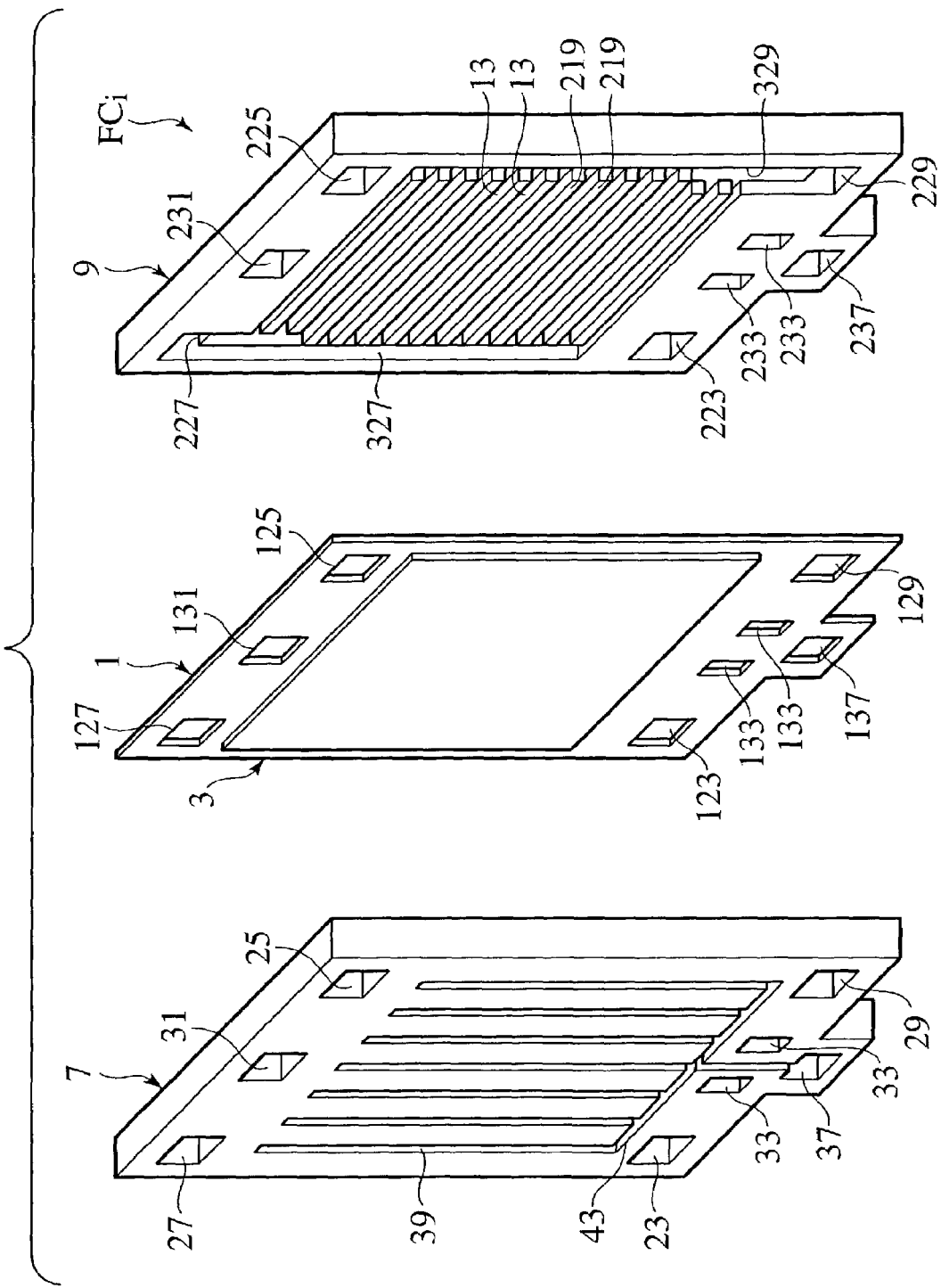
FIG. 8 is an exploded perspective front view of a laminated portion of the fuel cell of FIG. 5.
Figure 9:
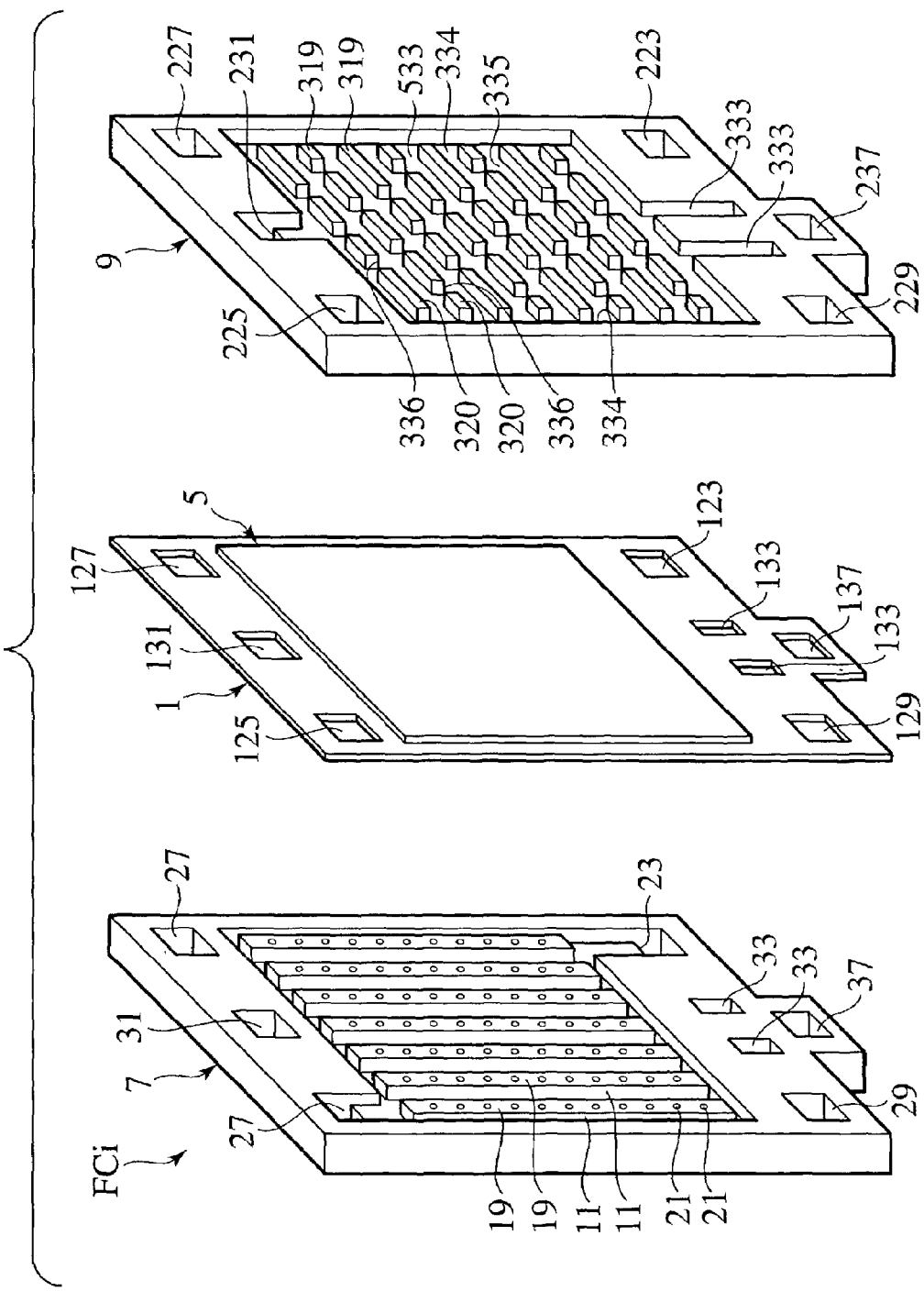
FIG. 9 is an exploded perspective rear view of the laminated portion of FIG. 8.
Figure 10:
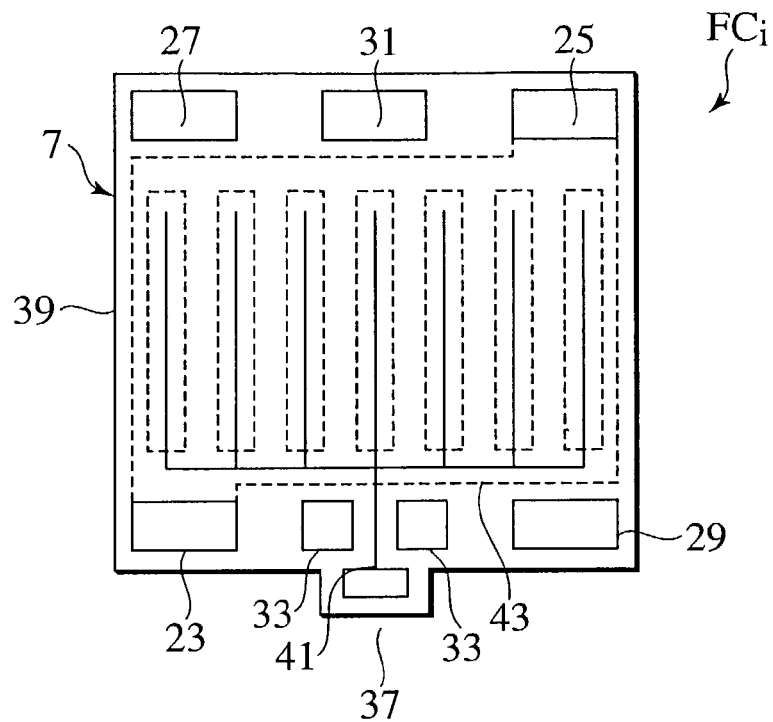
FIG. 10 is a front view of an entirety of the fuel supply plate of FIG. 7.
Figure 11:
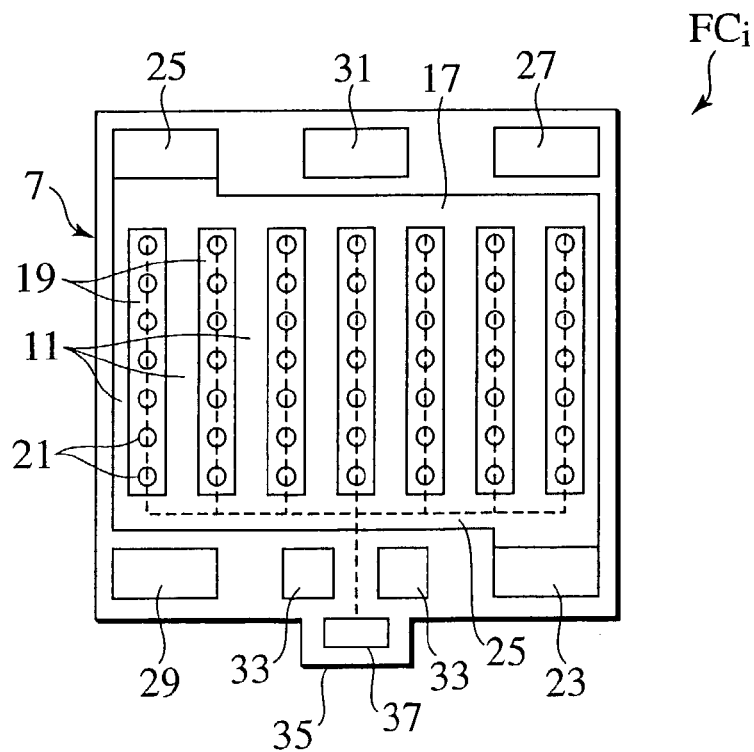
FIG. 11 is a rear view of the fuel supply plate of FIG. 10.

FIG. 4 shows a vertical section of a lower portion of an arbitrary fuel cell $FC_i$, FIG. 5 shows a horizontal section of an entirety of the fuel cell $FC_i$, FIG. 6 shows a detailed horizontal section at a different level of the fuel cell $FC_i$, FIG. 7 shows a yet detailed partial view of a fuel supply plate 7 of the fuel cell $FC_i$, FIG. 8 shows an exploded perspective front view of the fuel cell $FC_i$ of FIG. 5, FIG. 9 shows an exploded perspective rear view of the fuel cell $FC_i$, FIG. 10 shows a front view of the fuel supply plate 7, and FIG. 11 shows a rear view of the fuel supply plate 7.

The fuel cell $FC_i$ includes: a cell frame (1+7+9) which is formed by a substantially rectangular front fluid supply plate (herein called "fuel supply plate") 7 as a bipolar plate, a substantially rectangular rear fluid supply plate (herein called "air supply plate") 9 as an opposing bipolar plate, and a peripheral portion of a substantially rectangular solid polymer membrane 1; a combination of an anode 3 and a cathode 5 provided in the cell frame, between the fuel supply plate 7 and the air supply plate 9; and a substantial (or remaining) portion of the solid polymer membrane 1, which works as a PET and is called "electrolytic membrane", carried or supported by the peripheral portion, and disposed between the anode 3 and the cathode 5, and which needs to be moisturized. It is noted that the solid polymer membrane 1 is homogeneous, so that practically the electrolytic membrane comprises the solid polymer membrane 1 and vice versa. The anode 3 is constituted as a catalyst-carrying substantially rectangular porous member, which is identical in outside dimension to the PET portion and adapted for diffusion of fuel F and moisture M supplied thereto. The cathode 5 is constituted as another catalyst-carrying substantially rectangular porous member, which also is identical in outside dimension to the PET portion, but is adapted for diffusion of air A supplied thereto in this embodiment). The fuel cell $FC_i$ further includes pieces 130 of sealant for necessary sealing between peripheral portions of the fuel supply plate 7 and the polymer membrane 1, and pieces 140 of sealant for necessary sealing between peripheral portions of the air supply plate 7 and the polymer membrane 1.

As detailed in FIG. 4, the sealant pieces 130 and 140 are configured as front and rear flat gaskets 110 and 120, respectively. The moisture introducing part 63 of the fuel cell stack 47 has in the fuel cell $FC_i$ a corresponding lamination or layer part, which is formed by respective downward protrusions of the fuel supply plate 7, front gasket 110, solid polymer membrane 1, rear gasket 120, and air supply plate 9.

The cell frame (1+7+9) is formed with fluid circuitry for the four types of fluids F, A, C, M to flow therethrough, and has, in a collective wording, a fuel supply path connected to the fuel supply line 51, a fuel effluent path connected to the fuel effluent line 53, an air supply path connected to the air supply line 55, an air effluent path connected to the air effluent line 57, a coolant supply path connected to the coolant supply line 59, a coolant effluent path connected to the coolant effluent line 61, and a moisture supply path connected to the moisture supply line 65.

The fuel supply path is configured as a combination of: a stack-longitudinal fuel supply port (23+123+223) which extends through a lower left part of the cell frame, and is constituted as a continuous connection of fuel supply holes 23, 123, and 223 formed in lower left corners of the fuel supply plate 7, polymer membrane 1, and air supply plate 9, respectively; and a vertical tree of two-dimensionally arrayed fuel supply branches (for example, long vertical grooves 11) which are formed as channels in a rear wall of the fuel supply plate 7 that contacts the anode 3, and connected to one hole 23 of the fuel supply port. The fuel supply branches are exposed and open along their lengths to the anode 3, for supplying the anode 3 with fuel F to be diffused in the catalyst-carrying porous member of the anode 3. The rear wall of the fuel supply plate 7 has an array of vertical island parts 19 left between and defined by the fuel supply branches.

The fuel effluent path is configured as a continuous connection of fuel effluent holes 25, 125, and 225 formed in upper right corners of the fuel supply plate 7, polymer membrane 1, and air supply plate 9, respectively, and connected to the vertical tree of fuel supply branches in the rear wall of the fuel supply plate 7.

The air supply path is configured as a combination of: a stack-longitudinal air supply port (27+127+227) which extends through an upper left part of the cell frame, and is constituted as a continuous connection of air supply holes 27, 127, and 227 formed in upper left corners of the fuel supply plate 7, polymer membrane 1, and air supply plate 9, respectively; and a vertical tree of two-dimensionally arrayed air supply branches (for example, long vertical grooves 327 and 329, and long horizontal grooves 13 defined by and between long horizontal islands 219) which are formed as channels in a front wall of the air supply plate 9 that contacts the cathode 5, and connected to one hole 227 of the air supply port. The air supply branches are exposed and open along their lengths to the cathode 5, for supplying the cathode 5 with air A to be diffused in the catalyst-carrying porous member of the cathode 5.

The air effluent path is configured as a continuous connection of air effluent holes 29, 129, and 229 formed in lower right corners of the fuel supply plate 7, polymer membrane 1, and air supply plate 9, respectively, and connected to the vertical tree of air supply branches in the front wall of the air supply plate 9.

The coolant supply path is configured as a combination of: a stack-longitudinal coolant supply port (31+131+231) which extends through an upper central part of the cell frame, and is constituted as a continuous connection of coolant supply holes 31, 131, and 231 formed in upper central parts of the fuel supply plate 7, polymer membrane 1, and air supply plate 9, respectively; and a vertical tree of two-dimensionally arrayed coolant circulation branches (for example, long vertical grooves 334, long horizontal grooves 335, and relatively long diagonal arrays 336 of or relatively short oblique arrays 533 of groove-interconnecting short vertical grooves 321 (see FIG. 5 and FIG. 6) defined by and between short divided islands 320) which are formed as channels in a rear wall of the air supply plate 9 that contacts a cell frame of a subsequent fuel cell $FC_{i+1}$, and connected to one hole 231 of the coolant supply port.

The coolant effluent path is configured as a pair of left and right continuous connections of coolant effluent holes 33, 133, and 233 formed in lower central parts of the fuel supply plate 7, polymer membrane 1, and air supply plate 9, respectively, and connected via vertical grooves 333 to the vertical tree of coolant circulation branches in the rear wall of the air supply plate 9.

The moisture supply path is configured as a combination of: a stack-longitudinal moisture supply port (37+137+237) which extends through a corresponding layer of the moisture introduction part 63 of the fuel cell stack 47, and is constituted as a continuous connection of moisture supply holes 37, 137, and 237 formed in protruded bottom parts of the fuel supply plate 7, polymer membrane 1, and air supply plate 9, respectively; a vertical tree of two-dimensionally arrayed moisture supply branches (for example, horizontal groove 43 and vertical grooves 41, 39) which are formed as channels in a front wall of the fuel supply plate 7, and connected to one hole 37 of the moisture supply port; and a vertical matrix of or a number of vertical arrays of moisture supply holes 21 as diameter-reduced ports or outlets communicating with vertical grooves 39 of the moisture supply branches in the front wall of the fuel supply plate 7 and opening at rear sides of the vertical islands 19 in the rear wall of the fuel supply plate 7 that contacts the anode 3. The moisture supply holes 21 are configured to supply the anode 3 with moisture M to be diffused or moved to the polymer membrane 1 through the catalyst-carrying porous member of the anode 3. As detailed in FIG. 4, the moisture supply holes 37 and 237 is interconnected by an intermediate port 100, which is a connected combination of a front hole 111 formed in the front gasket 110, the moisture supply hole 137 formed in the solid polymer membrane 1, and a rear hole 121 formed in the rear gasket 120.

The fuel cell system FCS-1 includes the stack 47 of fuel cells $FC_i$ each of which has the solid polymer membrane 1 as an electrolytic membrane to be moisturized. The fuel cell system FCS-1 is thus formed with: a set of laminated cell frames; a combination of a set of anodes 3 of which a corresponding anode 3 is provided in a respective cell frame of the set of laminated cell frames and a set of cathodes 5 of which a corresponding cathode 5 is provided in the respective cell frame; a set of electrolytic membranes 1 of which a corresponding electrolytic membrane 1 is disposed between the corresponding anode 3 and the corresponding cathode 5; a network of fuel supply paths supplying the fuel F to the set of anodes 3, the network of fuel supply paths extending through the set of laminated cell frames and having a fuel supplying opening 11 in the rear wall of the fuel supply plate 7 as a first wall of the respective cell frame contacting the corresponding anode 3; a network of air supply paths supplying air A to the set of cathodes 5, the network of air supply paths extending through the set of laminated cell frames and having an air supplying opening 13 in the front wall of the air supply plate 9 as a second wall of the respective cell frame contacting the corresponding cathode 5; and a network of moisture supply paths supplying the moisture M movable through the corresponding anode 3 to the corresponding electrolytic membrane 1, the network of moisture supply paths extending through the set of laminated cell frames and having a set of moisture supplying outlets 21 provided in the first wall, at different locations from the fuel supply opening 11.

FIG. 12 shows, in longitudinal sectional view, essential portions of a fuel cell stack assembly FSA in a fuel cell system FCS-2 according to a second embodiment of the present invention, and FIG. 13 shows, in perspective view, a moisture pressure regulating valve 69 operable with a form memory member as a thermosensitive member 77 in the fuel cell stack assembly FSA of FIG. 12. Reference characters in ( ) refer to those in other embodiments, and designate like members or elements. Note that the thermosentive member 77 comprises a form memory member.

The fuel cell system FCS-2 according to the second embodiment is different from the fuel cell system FCS-1 in the first embodiment, in that a respective fuel cell $FC_i$ has an additional moisture supply path for supplying a moisture M through an air supply plate (9) to moisturize a solid polymer membrane (1) from a cathode side thereof, and that the fuel cell stack assembly FSA has the pressure regulating valve 69 installed in a front end plate 49 as a manifold plate of a fuel cell stack (47) thereof.

The additional moisture supply path is configured as a combination of: an additional vertical tree of two-dimensionally arrayed moisture supply branches (for example, horizontal grooves and vertical grooves 239) which are formed as channels in a rear wall of the air supply plate (9), and connected to one hole 237 of a moisture supply port (37+100 (with 137 inclusive)+237); and a vertical matrix of or a number of horizontal arrays of moisture supply holes 221 as diameter-reduced ports or outlets communicating with the vertical grooves 239 of the moisture supply branches in the rear wall of the air supply plate (9) and opening at front sides of horizontal islands (219) in a front wall of the air supply plate (9) that contacts a cathode (5). The moisture supply holes 221 are configured to supply the cathode (5) with moisture M to be diffused or moved to the polymer membrane (1) through a catalyst-carrying porous member of the cathode (5).

The fuel cell system FCS-2 thus includes the stack (47) of fuel cells $FC_i$ each of which has the solid polymer membrane (1) as an electrolytic membrane to be moisturized. The fuel cell system FCS-2 is formed with: a set of laminated cell frames; a combination of a set of anodes (3) of which a corresponding anode (3) is provided in a respective cell frame of the set of laminated cell frames and a set of cathodes (5) of which a corresponding cathode (5) is provided in the respective cell frame; a set of electrolytic membranes (1) of which a corresponding electrolytic membrane (1) is disposed between the corresponding anode (3) and the corresponding cathode (5); a network of fuel supply paths supplying a fuel (F) to the set of anodes (3), the network of fuel supply paths extending through the set of laminated cell frames and having a fuel supplying opening (11) in the rear wall of the fuel supply plate (7) as a first wall of the respective cell frame contacting the corresponding anode (3); a network of air supply paths supplying air (A) to the set of cathodes (5), the network of air supply paths extending through the set of laminated cell frames and having an air supplying opening 13 in the front wall of the air supply plate (9) as a second wall of the respective cell frame contacting the corresponding cathode (5); and a network of moisture supply paths supplying the moisture M movable through a respective one (3, 5) of the corresponding anode (3) and the corresponding cathode (5) to the corresponding electrolytic membrane (1), the network of moisture supply paths extending through the set of laminated cell frames and having a set of moisture supplying outlets 21 or 221 provided in either of the first wall and the second wall, at different locations from one (11, 13) of the fuel supplying opening (11) and the air supplying opening (13) corresponding to the above-noted either of the first wall and the second wall.

The fuel cell system FCS-2 includes the network of moisture supply paths having a moisture introducing path 71 for the moisture M to be introduced thereto, a network of coolant circulation paths for a coolant C to be circulated through the set of laminated cell frames, the network of coolant circulation paths having a coolant effluent path 61a (and 61b) for the coolant C to outflow therefrom, the form memory member as a thermosensitive member 77 configured to deform in dependence on a temperature of the coolant C in the coolant effluent path 61a (61b), and a valve member as the pressure regulating valve 75 operative by deformation of the thermosensitive member 77 to regulate a flow rate of the moisture M in the moisture introducing path 71. Note that the thermosensitive member 77 is exposed at a top thereof to effluent coolant C. The top of the thermosensitive member 77 may be bifurcated into respective coolant effluent paths 61a (61b) or may not be exposed to the coolant C, but necessarily be placed in a suitable position, such as in a vicinity of the coolant effluent path, where temperature variation of the effluent coolant C is sensible.

Figure 14A:
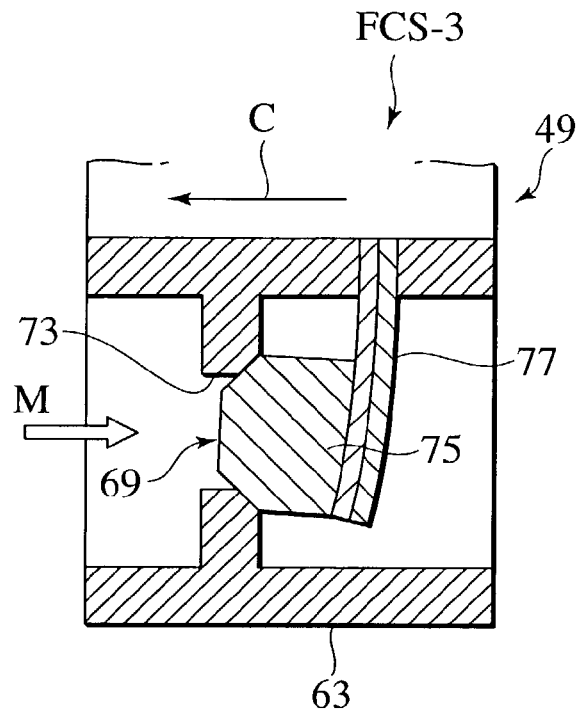
Figure 14B:
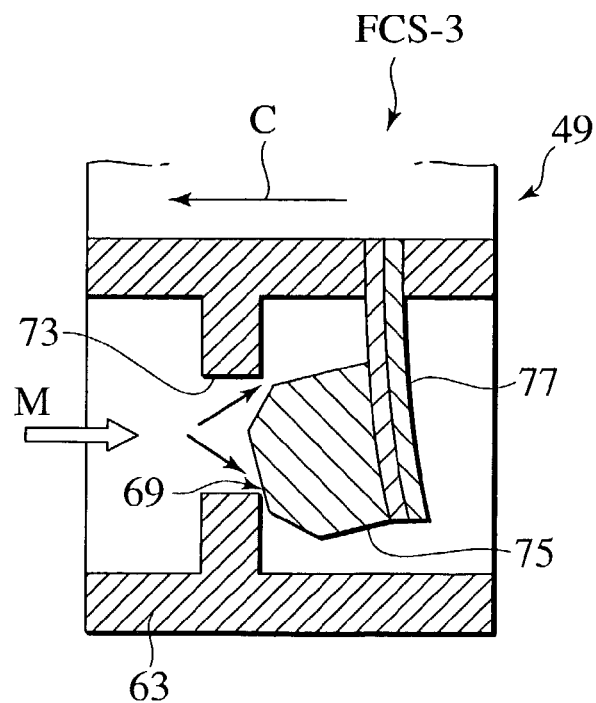

FIG. 14A and FIG. 14B show, in section, a moisture pressure regulating valve 69 operable with a bimetal member as a thermosensitive member 77 in a fuel cell system FCS-3 according to a third embodiment of the present invention, in which FIG. 14A illustrates a close condition of the valve 69, and FIG. 14B illustrates an open condition of the valve 69. The fuel cell system FCS-3 according to the third embodiment is different from the fuel cell system FCS-2 according to the second embodiment, in that the thermosensitive member 77 comprises a bimetal member.

Figure 15:
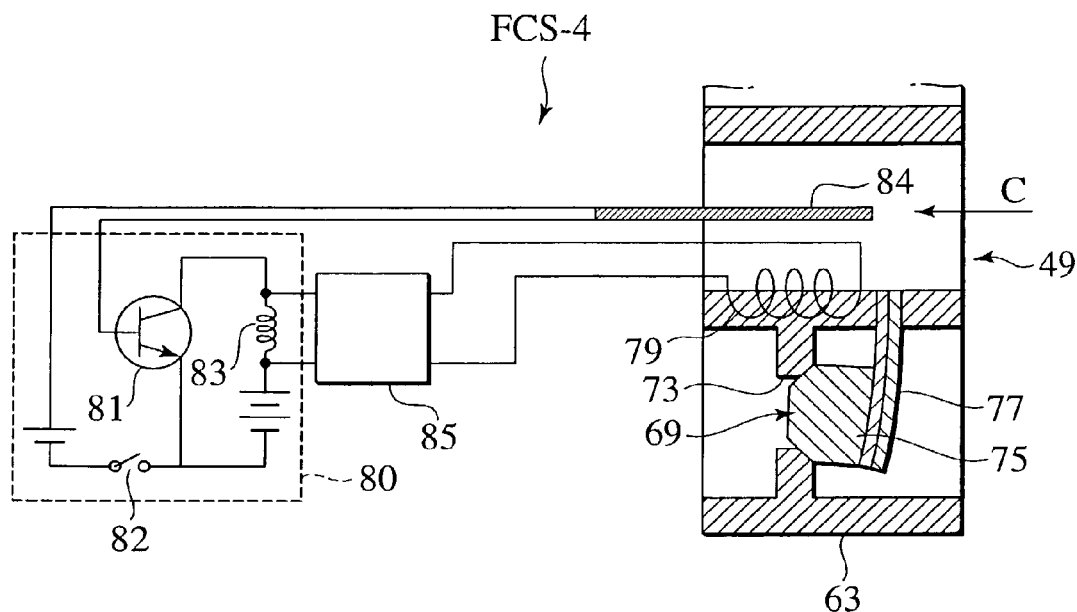
FIG. 15 is an illustrative block diagram of a controller of a moisture pressure regulating valve in a fuel cell system according to another embodiment of the present invention.

FIG. 15 shows, in an illustrative block diagram, an electric controller 80 of a moisture pressure regulating valve 69 in a fuel cell system FCS-4 according to a fourth embodiment of the present invention. The fuel cell system FCS-4 in the fourth embodiment is different from the fuel cell system FCS-3 in the third embodiment in that a heat dissipation controlled heater 79 is disposed near a thermosensitive member 77. The controller 80 has a thermocouple or temperature measuring resistor 84 for detecting a temperature of effluent coolant C in a front end plate 49, a transistor amplifier 81 for amplifying a detection signal from the temperature measuring resistor 84, and a power supply 85 for supplying the heater 79 with controlled electric power. Designated by reference character 82 is a manual switch, and 83 is a drive coil. A thermosensitive member 77 of the valve 69 may not be exposed, even at its top, to the effluent coolant C.

Figure 16:
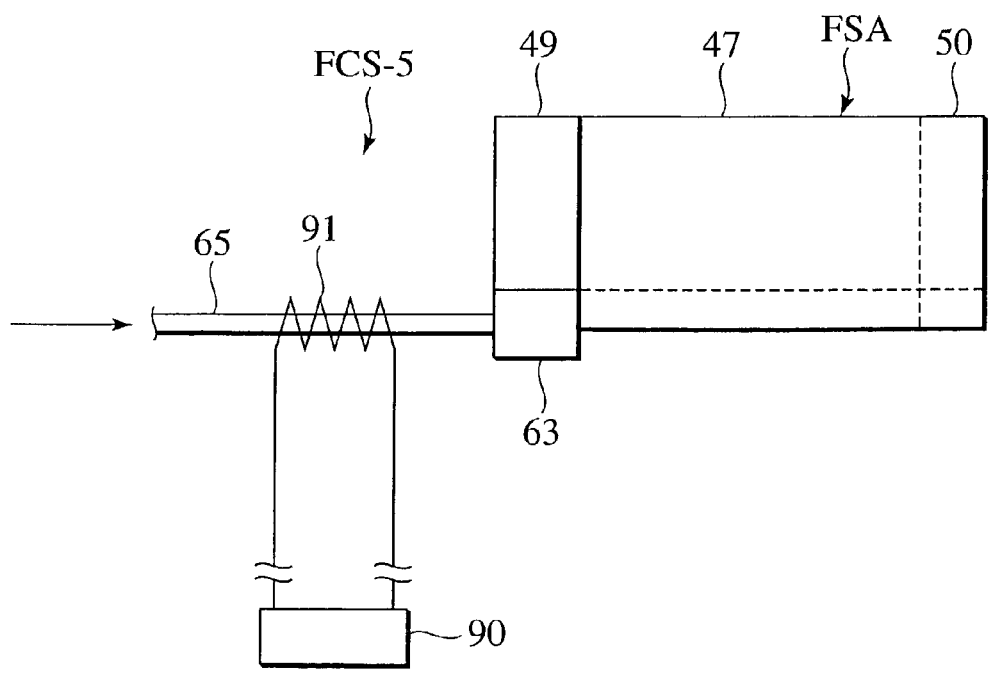
FIG. 16 is an illustrative block diagram of a controller of a moisture pressure regulating valve in a fuel cell system according to another embodiment of the present invention.

FIG. 16 shows, in an illustrative block diagram, an electric controller 90 of a moisture pressure regulating valve (69) in a fuel cell system FCS-5 according to a fifth embodiment of the present invention. The fuel cell system FCS-5 in the fifth embodiment is different from the fuel cell system FCS-4 in the fourth embodiment in that moisture M in a moisture supply line 65 is heated by a heater 91 heating the supply line 65. It is noted that the controller 90 has a thermocouple or temperature measuring resistor (84) disposed in or near an effluent coolant path (61a, 61b) in a front end plate 49 of a fuel cell stack 47, and a detection signal therefrom is processed to control the heater 91. The moisture M with a controlled temperature passes a moisture supply path in the front end plate 49, where it controls the moisture pressure regulating valve (69).

The foregoing embodiments are described below from different points of view.

As shown in FIG. 6, the fuel cell system FCS-1 has an anode 3 as a first electrode, a cathode 5 as a second electrode, with an electrolytic membrane 1 in the center therebetween. Hydrogen supplied as a fuel F to the anode 3 is dissociated at the electrode into hydrogen ions, which pass through the electrolytic membrane 1, and electrons, which pass through an external circuit, transiting to the cathode 5, where they react with oxygen in air A supplied to the cathode 5 to form water. Electrons passing through the external circuit form an electric current, which supplies electric power.

A fuel supply plate 7 is disposed as a supply plate at the anode 3 side and an air supply plate 9 is disposed as a supply plate at the cathode 5 side. The fuel supply plate 7 has a plurality of groove-shaped fuel supply paths 11 as fuel paths for supplying hydrogen, formed in a direction that is perpendicular to the paper plane in FIG. 6, and the air supply plate 9 has a plurality of groove-shaped air supply paths 13 for supplying air, formed in a direction that is perpendicular to the paper plane in FIG. 6.

FIG. 7 is a perspective view showing the anode 3 side of the fuel supply plate 7, this being a part of the fuel supply plate 7 on the surface on which fuel supply paths 11 are formed in the fuel cell FC1 with solid polymer membrane. FIG. 10 is a front view of the fuel supply plate 7. FIG. 11 is a rear view seen from the anode 3 side of the fuel supply plate 7. The plurality of fuel supply paths 11, as shown in FIG. 11, are in mutual communication via lower and upper communicating paths 15 and 17 formed on the lower and upper parts of the fuel supply plate 7. By adopting this configuration, island parts 19 are formed, which are surrounded by the fuel supply paths 11 and the lower and upper communicating paths 15 and 17, each of these island parts 19 having formed in it a plurality of moisture supply paths 21, which pass through between the front and rear sides of the fuel supply plate 7.

At the right end of the lower communicating path 15 in FIG. 11, a fuel supply hole 23 is formed so as to pass through the fuel supply plate 7 in a direction perpendicular to the paper plane in FIG. 11, and at the left end of the upper communicating path 17 in FIG. 11, a fuel effluent or drain hole 25 is formed so as to pass through the fuel supply plate 7 in a direction perpendicular to the paper plane in FIG. 11. More specifically, fuel F supplied to the fuel supply plate 7 via the fuel supply hole 23 from the front side of the fuel supply plate 7 passes through the lower communicating path 15, the fuel supply paths 11, and the upper communicating path 17, and is supplied to the anode 3, part of the unreacted fuel being drained to the front side of the fuel supply plate 7 from the fuel drain hole 25.

At the upper right end part of the fuel supply plate 7 in FIG. 11 an air supply hole 27 is formed passing through the fuel supply plate 7 in a direction perpendicular to the paper plane in FIG. 11, and at the lower left end part of the fuel supply plate 7 an air effluent or drain hole 29 is formed passing through the fuel supply plate 7 in a direction perpendicular to the paper plane in FIG. 11. The air supply hole 27 and the air drain hole 29 pass through an air supply path and an air drain path extending upward and downward in FIG. 6, and communicate respectively with the air supply paths 13. The air supply paths 13 are connected at both ends thereof to left and right communicating paths, these communicating paths providing mutual communication between a plurality of air supply paths. That is, air supplied to the air supply hole 27 from the front side of the fuel supply plate 7 passes through a longitudinal air supply path, a left communicating path, air supply paths 13, and a right communicating path, whereupon it is supplied to the cathode 5, part of the unreacted air passing through a longitudinal air drain path so as to be drained to the front side, passing the air drain hole 29.

A coolant supply hole 31 is formed at the top center part of the fuel supply plate 7 as shown in FIG. 11, and two coolant effluent or drain holes 33 are formed at the bottom centeral part of the fuel supply plate 7 in a direction perpendicular to the paper plane in FIG. 11. Coolant supplied from the front side of the fuel supply plate 7 through the coolant supply hole 31 passes through a longitudinal coolant supply path, and flows in coolant paths formed, for example, on the rear side of the air supply plate 9. Then, after cooling the fuel cell that had become heated by reaction, the coolant passes through coolant effluent or drain paths in the air supply plate 9, and is drained from the coolant drain holes 33.

A protrusion 35 protruding downward in FIG. 11 is formed in a region including the two coolant drain holes 33 of the fuel supply plate 7, and a longitudinal moisture introduction port or hole 37 is formed in the protrusion 35.

On the front side of the island parts 19, in which are formed moisture supply paths 21, there are formed grooves 39 communicating with the moisture paths 21, in arrays along directions of extension of the islands 19. A central groove 39 communicates with one end of an extended groove 41 between the two coolant drain holes 33, while the other end of the extended groove 41 communicates with the moisture introduction hole 37. The vertical grooves 39 mutually communicate at their lower ends via a communicating groove 43 extending in the horizontal direction in FIG. 10. That is, moisture M is introduced from the front side via the moisture introduction hole 37, and passes from the extended groove 41, through the communicating groove 43, to be supplied to the anode 3 from the moisture supply paths 21.

The above-noted anode 3 and cathode 5 are centered to front and rear sides of the electrolytic membrane 1, respectively, and extend along the fuel supply plate 7 and air supply plate 9, respectively, to constitute one cell $FC_i$. By successively laminating such cells in the longitudinal direction, a fuel cell stack 47 is formed, as shown in FIG. 2.

In FIG. 2, the left end plate of the fuel cell stack 47 is formed as a manifold plate 49. The manifold plate 49 is attached in intimate contact with a fuel supply plate 7 of a first fuel cell $FC_1$. The manifold plate 49 is provided with manifold paths communicating with the fuel supply holes 23, fuel drain holes 25, air supply holes 27, air drain holes 29, coolant supply holes 31, coolant drain holes 33, and moisture introduction holes 37 mutually separated from each other. For the fuel F, air A, and coolant C, the manifold plate 49 has connections to fuel lines 51 and 53, which communicate respectively with fuel supply holes 23 and fuel drain holes 25 in a stack of fuel cells, air lines 55 and 57, which communicate respectively with air supply holes 27 and air drain holes 29 in the stack of fuel cells, and coolant lines 59 and 61, which communicate respectively with coolant supply holes 31 and coolant drain holes 33 in the stack of fuel cells.

A moisture introduction part 63, to which moisture M is introduced, is provided in a region of the drain outlet of the moisture line 61, which drains coolant at the bottom part in FIG. 2, in the manifold plate 49. One end of a moisture introduction line 65 is connected to the coolant introduction part 63, and another end of the moisture introduction line 65 is connected to a water tank 67. The air line 57, through which air A drained off from the manifold plate 49 passes, is connected at the top part of the water tank 67, and water W is obtained by causing condensation of the drained off air. Supply of the moisture M to the manifold plate 49 is done by a pump P, which pumps water W as the moisture M to through the moisture introduction line 65. It may be done by application of pressure by the residual pressure of the drained off air.

FIG. 12 is an enlarged cross-sectional view showing the area surrounding the above-noted moisture introduction part 63. A moisture pressure-adjusting valve 69 is provided in the moisture introduction part 63, this valve adjusting the amount of supply of moisture M. A moisture introduction path 71 is formed as a continued connection of moisture introduction holes 37 of N fuel cells, at the lower part of the moisture introduction part 63, which is provided with the moisture pressure-adjusting valve 69.

FIG. 14A and FIG. 14B show details of the moisture pressure-adjusting valve 69, in which a valve body 75 enabling opening and closing of a restriction part 73 is supported by a bimetal element 77, which serves as a temperature-sensitive member. The bimetal element 77 is mounted to a lower end of the manifold plate 49, having an upward extension from the valve body 75 in a region of the coolant drain outlet, and is displaced in response to the temperature at the lower part of the manifold plate 49, that is, by the temperature of the drained coolant, which is representative of the temperature of the fuel cell. More specifically, when the temperature of the coolant drained from the fuel cell is low, the bimetal element 77 displaces in the leftward direction, so as to bring the valve body 75 closer to a restriction part 73, thereby reducing the amount of moisture. On the other hand, if the temperature of the drained coolant is high, the bimetal element 77 displaces in the rightward direction, so as to move the valve body 75 away from the restriction part 73, thereby increasing the amount of coolant.

The present invention configured as described above operates as follows.

For example, in the fuel cell system FCS-1, the fuel cell stack 47 is supplied with both fuel F and air A through the manifold plate 49, and additionally is supplied with coolant C that suppresses heating caused by the reaction occurring therewithin. The supplied air A is passed from the air line 57 to the water tank 67, whereupon condensation occurs, thereby producing water W serving as the moisture M. The moisture M is pressured, by the action of the pump P, so as to pass through the moisture introduction line 65, and subsequently reach the moisture introduction part 63.

Having reached the moisture introduction part 63, the moisture M passes through the moisture pressure-adjusting valve 69, which adjusts the pressure in response to the temperature of the manifold plate 49, the moisture M passes through the restriction part 73, which is opened and closed by the moisture pressure-adjusting valve 69 in response to the temperature of the manifold plate 49, and passes from the moisture introduction hole 37 of each fuel cell $FC_i$, and then passing through the communicating groove 43 and the grooves 39, subsequently reaching the moisture supply paths 21.

Having reached the moisture supply path 21, the moisture M is directly supplied to the anode 3, where it is diffused or moved to permeate, reaching the electrolytic membrane 1, thereby moisturizing or wetting the electrolytic membrane 1.

In a case of starting the fuel cell system FCS-3, in which an average temperature of the N fuel cells is low, because the opening at the moisture pressure-adjusting valve 69 is small, and the supply pressure of the moisture M is low, the moisture M is supplied directly to the anode 3, with neither a drop in the performance caused by excessive moisture, nor direct contacting of the fuel F by the moisture M in the course up to the anode 3, the result being avoidance of a situation in which condensation of the moisture M occurs within the fuel supply path or within the air supply path, thereby causing water clogging, which lowers the performance of the fuel cell. When the average fuel cell temperature is high, the opening at the moisture pressure-adjusting valve 69 enlarges, thereby increasing the moisture supply pressure, so that a required amount of moisture M is supplied to the electrolytic membrane 1. Because the amount of the moisture M that soaks into the electrolytic membrane 1 and is then removed therefrom is controlled by the pressure of the supplied moisture M, there is constant replenishment from the water tank 67, which receives the residual pressure of the drained air.

Thus, because the amount of moisture M that soaks into the electrolytic membrane 1 changes in response to a change in an average temperature of the N fuel cells, thereby controlling the amount of hydration, it is possible to perform proper and reliable moisturizing of the electrolytic membrane 1. Additionally, because the structure therefor is one in which a moisture path and a moisture pressure-adjusting valve 69 are merely provided within the manifold plate 49, it is possible to avoid having the fuel cells become large, this being particularly preferred for application to an automotive fuel cell, which is required to be compact.

Although it is possible in the case in which a high output is to be obtained with temperatures of the fuel cells low, for the amount of moisture M is insufficient, resulting in a decrease in electrical generation efficiency, as long as the voltage is within the operating range and not below a prescribed lower limit voltage for the fuel cells, the amount of generated heat will increase, so that the temperatures of the fuel cells rise, this resulting in an increase in the opening at the moisture pressure-adjusting valve 69, thereby achieving the required amount of moisture M. For this reason, it is not necessary to provide any additional feedback control, making it possible to perform independent control of the amount of moisture M.

In the case of fuel cell systems FCS-2 and FCS-3, moisture M is supplied to the electrolytic membrane 1 by providing supply paths in the air supply plate 9 also and passing it through the cathode 5 as well, in addition to the structure of FCS-1. It will be seen that moisture M may be supplied simply via the air supply plate 9, i.e., without having moisture supply paths in the fuel supply plate 7.

FIG. 15 shows a drawing of an example in which an electrical heater 79 is provided as a heating means in or on the manifold plate 49, at the moisture introduction part 63 to which the bimetal element 77 is attached. In this case, by controlling the amount of electrical current passing through the heater 79, it is possible to accelerate the displacement of the bimetal element 77, thereby improving the responsiveness of the moisture pressure-adjusting valve 69, so as to improve the control response in controlling the amount of moisture M supplied.

In the embodiment shown in FIG. 16, we see an example in which an electrical heater 81 is provided as a heating means on the moisture introduction line 65. In this case, in addition to the electrical heater 81 heating the moisture introduction line 65, there is also done a heating of the moisture M itself which flows therethrough. The heated moisture introduction line 65 and heated moisture in turn heats the bimetal element 77. The result of this heating action is that, taking the example shown in FIG. 16, there is a further improvement in the control response in controlling the amount of moisture M supplied. In this case, however, it is necessary to keep the heating to within a level that does cause the moisture M within the moisture introduction line 65 to boil.

It should be noted that, in the fuel cell system FCS-2, a shape memory alloy is substituted for the bimetal element 77.

Additionally, an accumulation pressure provided by the pump P pumping the moisture M into an accumulator can be provided by a compressor that is used also to supply air A to the fuel cell itself, thereby enabling a simplification of the overall fuel cell system.

In order to achieve the object, the present invention can adopt a variety of forms.

A first example is a fuel cell with a solid polymer membrane, wherein an electrolytic membrane made of a solid polymer is disposed between a first electrode supplied with fuel and a second electrode supplied with air, and wherein a supply plate having a supply path supplying fuel or air is disposed at least one of the electrodes, a humidification supply path directly supplying humidification to the electrolytic membrane via one of the electrodes is provided at a position on the supply plate not interfering with the other supply path.

According to the first example of fuel cell with a solid polymer membrane having the above-described configuration, moisture is directly supplied to the electrolytic membrane via an electrode from the a moisture supply path, without coming into direct contact with either fuel or air, thereby not only achieving proper and reliable direct supply to the electrolytic membrane via an electrode, but also avoiding making the fuel cell large and heavy.

A second example is a variation on the fuel cell of the first example, wherein the moisture supply path is provided on a supply plate having a supply path supplying fuel.

According to the second example of fuel cell with a solid polymer membrane having the configuration of the second aspect of the present invention, moisture is directly supplied from the a moisture supply path to the electrolytic membrane via an electrode supplying fuel, without coming into direct contact with the fuel. The result of this arrangement it is possible to provide sufficient hydration to fuel supply side, which normally tends to dry out because when hydrogen ions move through the electrolytic membrane, water moves in concert therewith.

A third example is a variation on the fuel cell of either the first or the second example, wherein the supply path has a plurality of grooves opening toward an electrode, moisture paths being formed so as to pass through a supply plate between each groove.

According to the third example of fuel cell with a solid polymer membrane having the configuration of the third aspect of the present invention, fuel or air flows through a plurality of grooves in a supply plate so as to be supplied to an electrode, and moisture passes through a moisture supply path passing through a supply plate and is directly supplied to an electrolytic membrane.

A fourth example is a variation on a fuel cell of any of the first to third examples, wherein a moisture introduction part, which introduces moisture to a moisture path is disposed in a region of a port for draining of coolant supplied to the fuel cell, and wherein a temperature-sensitive material, which exhibits displacement with a change of temperature of the drained coolant is provided on the moisture introduction part, a flow-adjusting valve being provided that operates so as to adjust the flow amount of the moisture flowing in the moisture introduction part in response to the displacement of the temperature-sensitive material.

According to the fourth example, when the temperature of the coolant drained from the fuel cell, which represents the temperature of the fuel cell, is low the temperature-sensitive material displaces so that the flow-adjusting valve closes the moisture introduction part, thereby decreasing the amount of supply of moisture, and when the temperature of the drained coolant is high, the temperature-sensitive material displaces so that the flow-adjusting valve opens the moisture introduction part, thereby increasing the amount of supply of moisture.

A fifth example is a variation on the fuel cell of the fourth example, further having means for heating provided in a region of a temperature-sensitive material.

According to the fifth example of fuel cell, the time of heating the temperature-sensitive material is controlled by the heating means, thereby controlling the amount of moisture supplied with improved control response.

A sixth example is a variation on the fuel cell of the fourth example, wherein a moisture introduction pipe is connected so as to communicate with a moisture introduction part, and a heating means is provided at the moisture introduction pipe.

According to the sixth example of fuel cell, by providing a heating means to heat the moisture introduction pipe, by thermal conduction via the moisture introduction pope and the moisture flowing therewithin, the temperature-sensitive material is heated. By controlling the heating time with respect to the temperature-sensitive material, quick control is achieved of the amount of moisture supplied.

A seventh example is a variation on a fuel cell according to any one of the fourth to sixth examples, wherein the temperature-sensitive material is a bimetal element.

According to the seventh example, the bimetal element displaces as a result of the influence of the coolant temperature, thereby reliably opening and closing the flow-adjusting valve.

An eighth example is a variation on a fuel cell according to any one of the fourth to sixth examples, wherein the temperature-sensitive material is a shape-memory alloy.

According to the eighth example, the shape-memory alloy displaces as a result of the influence of the coolant temperature, thereby reliably opening and closing the flow-adjusting valve.

A ninth example is a variation of a fuel cell according to any of the first to eighth examples, wherein air ejected from the fuel cell is condensed and the resulting water used as moisture.

According to the ninth example, water resulting from condensing the air ejected from the fuel cell is used as moisture is passed as moisture from the moisture supply path, via an electrode, without allowing it to come into direct contact with either fuel or air. This aspect of the present invention eliminates the need for a dedicated supply of moisture, and is a preferred aspect of the present invention for application, for example, as a fuel cell for a mobile platforms such as vehicles.

The contents of Japanese Patent Application No. 2000-277138 are incorporated herein by reference.

While preferred embodiments of the present invention have been described using specific terms, such description is for illustrative purpose, and it is to be understood that changes and variations may be made without departing from the scope of the claims.

INDUSTRIAL APPLICABILITY

According to the present invention, a fuel cell having a solid polymer membrane as an electrolytic membrane to be moisturized is allowed to be moisturized at the membrane, without making the fuel cell large or lowering performance thereof.

The invention claimed is:

1. A fuel cell having a solid polymer membrane as an electrolytic membrane to be moisturized, comprising:
    a cell frame;
    a combination of an anode and a cathode provided in the cell frame;
    an electrolytic membrane disposed between the anode and the cathode;
    an air supply path supplying air to the cathode;
    a fuel supply path supplying a fuel to the anode, the fuel supply path extending through the cell frame and having a fuel supplying opening in a first wall of the cell frame contacting the anode;
    a first moisture supply path supplying a liquid moisture movable through the anode to the electrolytic membrane, the first moisture supply path extending through the cell frame and having a first set of moisture supplying outlets in the first wall at different locations from the fuel supplying opening and a moisture introducing path for the liquid moisture to be introduced thereinto;
    a coolant circulation path for a coolant to be circulated through the cell frame, the coolant circulation path being separated from the first moisture supply path;
    a thermosensitive member configured to deform in dependence on a temperature of the coolant outflowing from the coolant circulation path; and
    a valve member operative by deformation of the thermosensitive member to regulate a flow rate of the liquid moisture in the moisture introducing path such that the flow rate of the liquid moisture is increased as the temperature of the coolant outflowing from the coolant circulation path increases.

2. A fuel cell according to claim 1, wherein:
    the air supply path extends through the cell frame and has an air supplying opening in a second wall of the cell frame contacting the cathode; and further comprising
    a second moisture supply path supplying a moisture movable through the cathode to the electrolytic membrane, the second moisture supply path extending through the cell frame and having a second set of moisture supplying outlets in the second wall at different locations from the air supplying opening.

3. A fuel cell according to claim 2, wherein the cell frame comprises:
    a first frame member having the first wall;
    a second frame member having the second wall; and a third frame member disposed between the first frame member and the second frame member and configured to carry the electrolytic membrane.

4. A fuel cell according to claim 3, wherein the anode comprises a first porous member disposed between the first frame member and the electrolytic membrane and configured to diffuse the fuel and to move the moisture movable therethrough, and the cathode comprises a second porous member disposed between the second frame member and the electrolytic membrane and configured to diffuse the air and to move the moisture movable therethrough.

5. A fuel cell according to claim 1, wherein the fuel supplying opening comprises a plurality of interconnected channels in the first wall, and the first set of moisture supplying outlets comprises a plurality of arrays of ports of which a respective array is disposed between neighboring two of the plurality of interconnected channels.

6. A fuel cell having a solid polymer membrane as an electrolytic membrane to be moisturized, comprising:
   a cell frame;
   a combination of an anode and a cathode provided in the cell frame;
   an electrolytic membrane disposed between the anode and the cathode;
   an air supply path supplying air to the cathode;
   a fuel supply path supplying a fuel to the anode, the fuel supply path extending through the cell frame and having a fuel supplying opening in a wall of the cell frame contacting the anode; moisture supply means for having a liquid moisture movable through the anode to the electrolytic membrane, supplied through the cell frame and via locations on said wall different from the fuel supplying opening;
   a coolant circulation path for a coolant to be circulated through the cell frame, the coolant circulation path being separated from the moisture supply means;
   a thermosensitive member configured to deform in dependence on a temperature of the coolant outflowing from the coolant circulation path; and
   a valve member operative by deformation of the thermosensitive member to regulate a flow rate of the liquid moisture to be supplied by the moisture supply means such that the flow rate of the liquid moisture is increased as the temperature of the coolant outflowing from the coolant circulation path increases.

7. A fuel cell according to claim 1, wherein the moisture supplying outlets are arranged in a two-dimensional array over a substantial extent of a surface of the anode.

8. A fuel cell according to claim 1, wherein the moisture supplying outlets face the anode.

9. A fuel cell according to claim 8, wherein the moisture supplying outlets are arranged in a two-dimensional array over a substantial extent of a surface of the anode.

10. A fuel cell according to claim 1, wherein the thermosensitive member comprises a bimetal.

11. A fuel cell according to claim 1, wherein the thermosensitive member comprises a shape memory alloy.

12. A fuel cell according to claim 1, wherein the thermosensitive member comprises a thermosensitive part exposed inside the coolant circulation path, and a thermally deformable part extending inside the first moisture supply path.

13. A fuel cell according to claim 1, further comprising a heating element controllable to generate heat to cause the thermosensitive member to deform.

* * * * *